United States Patent [19]
Gage

[11] Patent Number: 5,695,888
[45] Date of Patent: Dec. 9, 1997

[54] PRESSURIZED-GAS ENERGY STORAGE CELL WITH INSULATED CATALYTIC SURFACES

[75] Inventor: Barry G. Gage, La Crescenta, Calif.

[73] Assignee: HE Holdings, Inc., Los Angeles, Calif.

[21] Appl. No.: 664,209

[22] Filed: Jun. 11, 1996

[51] Int. Cl.$^6$ ............................................. H01M 10/34
[52] U.S. Cl. ............................................ 429/57; 429/101
[58] Field of Search ................................. 429/101, 57

[56] References Cited

U.S. PATENT DOCUMENTS

| | | |
|---|---|---|
| 3,669,744 | 6/1972 | Tsenter et al. |
| 4,000,350 | 12/1976 | Wittmann . |
| 4,250,235 | 2/1981 | DuPont et al. |
| 4,262,061 | 4/1981 | Rogers . |
| 4,283,844 | 8/1981 | Milden et al. |
| 4,369,212 | 1/1983 | Rogers et al. |
| 4,584,249 | 4/1986 | Smithrick . |
| 4,683,178 | 7/1987 | Stadnick et al. |

Primary Examiner—John S. Maples
Attorney, Agent, or Firm—Elizabeth E. Leitereg; Terge Gudmestad; Wanda K. Denson-Low

[57] ABSTRACT

An energy storage cell includes a cylindrical pressure vessel, a porous ceramic coating on the interior surface of the pressure vessel, a plurality of insulating stripes of an electrically insulating polymeric coating on the interior surface of the porous ceramic coating, and a plurality of catalytic stripes of a catalytic material overlying the plurality of insulating stripes. The insulating material is preferably a polymer such as polytetrafluoroethylene. The catalytic material catalyzes the chemical combination of hydrogen and oxygen, and is preferably a mixture of platinum powder, polytetrafluoroethylene, and methocel. The insulating stripes and catalytic stripes lie around the circumference of the cylindrical pressure vessel and extend parallel to the cylindrical axis of the cylindrical pressure vessel. The energy storage cell further includes a plate stack having a plurality of plate sets within the wall of the pressure vessel, with the plate sets lying perpendicular to the cylindrical axis. Each plate set includes a positive electrode, a negative electrode, and a separator between the positive electrode and the negative electrode. The separator contacts the porous ceramic coating between the stripes of the electrically insulating coating. There are, additionally, a screen between each plate set, an electrolyte within the pressure vessel, and a pair of electrical leads extending from the plate stack and through an electrical feedthrough in the wall of the pressure vessel to an exterior of the pressure vessel.

13 Claims, 3 Drawing Sheets

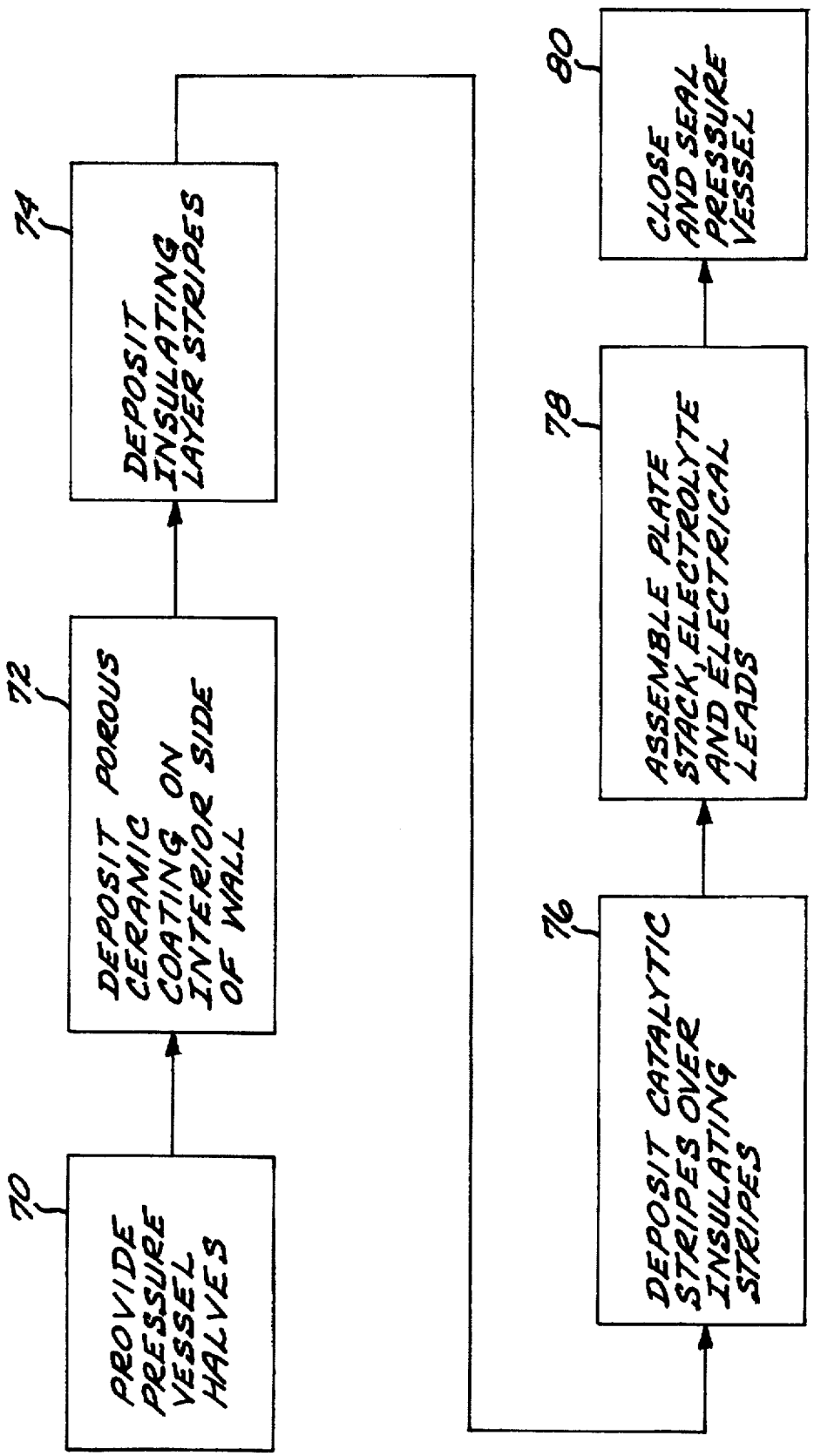

PRESSURIZED-GAS ENERGY STORAGE CELL WITH INSULATED CATALYTIC SURFACES

BACKGROUND OF THE INVENTION

This invention relates to energy storage cells, and, more particularly, to pressurized gas energy storage cells such as nickel-hydrogen energy storage cells.

Rechargeable cells or batteries are electrochemical energy storage devices for storing and retaining an electrical charge and later delivering that charge as useful power. Familiar examples of the rechargeable energy storage cell are the lead-acid cell used in automobiles, and the nickel-cadmium cell used in various portable electronic devices. Another type of energy storage cell having a greater storage capacity for its weight is the nickel oxide/pressurized hydrogen energy storage cell, an important type of which is commonly called the nickel-hydrogen energy storage cell and is used in spacecraft applications. The weight of the spacecraft energy storage cell must be minimized while achieving the required performance level, due to the cost of lifting weight to earth orbit and beyond.

The nickel-hydrogen energy storage cell includes a series of active plate sets which store an electrical charge electrochemically and later deliver that charge as a useful current. The active plate sets are packaged within a hermetic pressure vessel that contains the plate sets and the hydrogen gas that is an essential active component of the energy storage cell. Each plate set includes a positive electrode, a negative electrode, and a separator between the two electrodes, all soaked with an electrolyte. In a typical energy storage cell, a number of plate sets are supported on a core under a compressive loading, with a gas screen between each plate set and with electrical connector leads extending to each electrode of each plate set. The gas screen provides a gas channel from the hydrogen electrode to the gas space outside the stack. A single nickel-hydrogen energy storage cell delivers current at about 1.3 volts, and a number of the energy storage cells are usually electrically interconnected in series to produce current at the voltage required by the systems of the spacecraft.

During the charging portion of the charging/discharging cycle of the energy storage cell, bubbles of oxygen and hydrogen are liberated at the active plate sets. The oxygen and hydrogen may recombine at the catalyzed negative (hydrogen) electrode, which can lead to localized burning of the electrode from the heat evolved in the recombination reaction. As a result, the active area of the negative electrode and the electrical storage capacity of the cell may be reduced.

To prevent this type of damage to the cell, it has been proposed to form catalytic areas of platinum particles on the inside wall of the pressure vessel, see U.S. Pat. No. 4,584,249. The platinum catalyzes the recombination of the oxygen and hydrogen at sites remote from the electrode, thereby avoiding damage to the negative electrode. While this approach is operable, the present inventor has recognized that it can potentially lead to internal shorting (self discharge) within the energy storage cell and also shorting from the interior of the cell to the cell walls. Such shorting paths are of concern, both because they reduce the performance of the cell and because they can be hazardous to persons and sensitive instrumentation outside of the cell.

There is a need for an improved approach to preventing damage to pressurized-gas energy storage cells by the recombination of oxygen and hydrogen during charging. The present invention fulfills this need, and further provides related advantages.

SUMMARY OF THE INVENTION

The present invention provides a pressurized-gas energy storage cell that is resistant to damage by the exothermic recombination of oxygen and hydrogen. A selective recombination site is provided remote from the negative electrode. Potential internal and external shorting is avoided. The present approach is fully compatible with existing energy storage cell design and performance.

In accordance with the invention, an energy storage cell comprises a hermetic pressure vessel having an interior and a wall with an interiorly facing surface. A porous ceramic coating resides on the interiorly facing surface of the wall, with the ceramic coating itself having an interiorly facing surface. There is an electrically insulating coating on a portion of the interiorly facing surface of the ceramic coating, the electrically insulating coating having an interiorly facing surface. A layer of a catalytic material that catalyzes the chemical combination of hydrogen and oxygen overlies the interiorly facing surface of the electrically insulating coating. The energy storage cell further includes at least one plate set within the interior of the pressure vessel, with each plate set comprising a positive electrode, a negative electrode, and a separator between the positive electrode and the negative electrode, arranged such that the separator contacts the porous ceramic coating. An electrolyte is provided within the pressure vessel, and a pair of electrical leads extends from the positive electrode and the negative electrode, respectively, of the plate set and through an electrical feedthrough in the wall of the pressure vessel to an exterior of the pressure vessel. The invention is also operable where there is no porous ceramic coating, and the electrically insulating coating directly contacts the interior of the wall.

The porous ceramic is preferably yttria-stabilized zirconium oxide with on the order of about 12 percent by volume porosity, so that it can act as a wick for the electrolyte to reach the separator. The electrically insulating coating is preferably a polymer such as polytetrafluoroethylene. The catalytic material preferably comprises platinum, and more preferably comprises a mixture of particles of a catalytic metal such as platinum, polytetrafluoroethylene, and methocel.

The hermetic pressure vessel is desirably of a generally cylindrical wall configuration, with the porous ceramic coating deposited on the interiorly facing surface of the wall. A plurality of insulating stripes of the electrically insulating polymeric coating are disposed around the circumference of the cylindrical wall and extend parallel to a cylindrical axis of the generally cylindrical wall. A plurality of catalytic stripes of the catalytic material overlie the plurality of insulating stripes. The result is that, upon inspection, the interior of the wall of the pressure vessel has alternating regions of catalytic material (over the electrically insulating polymeric coating) and the porous ceramic coating visible between the stripes of catalytic material. The separator contacts the porous ceramic coating between the stripes of the electrically insulating coating.

Oxygen liberated during charging of the plate sets diffuses to the catalytic region and chemically reacts with the liberated hydrogen. The heat of reaction heats the resulting water and also diffuses outwardly to the metallic wall of the pressure vessel. Burning of the negative electrode due to heat evolution during recombination is avoided. The polymeric coating of the electrically insulating layer and the polymeric structure of the catalytic material effectively insulates the reactive region against internal and external shorting. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is a block diagram of a method for preparing the energy storage cell.

DETAILED DESCRIPTION OF THE INVENTION

Figure 1:
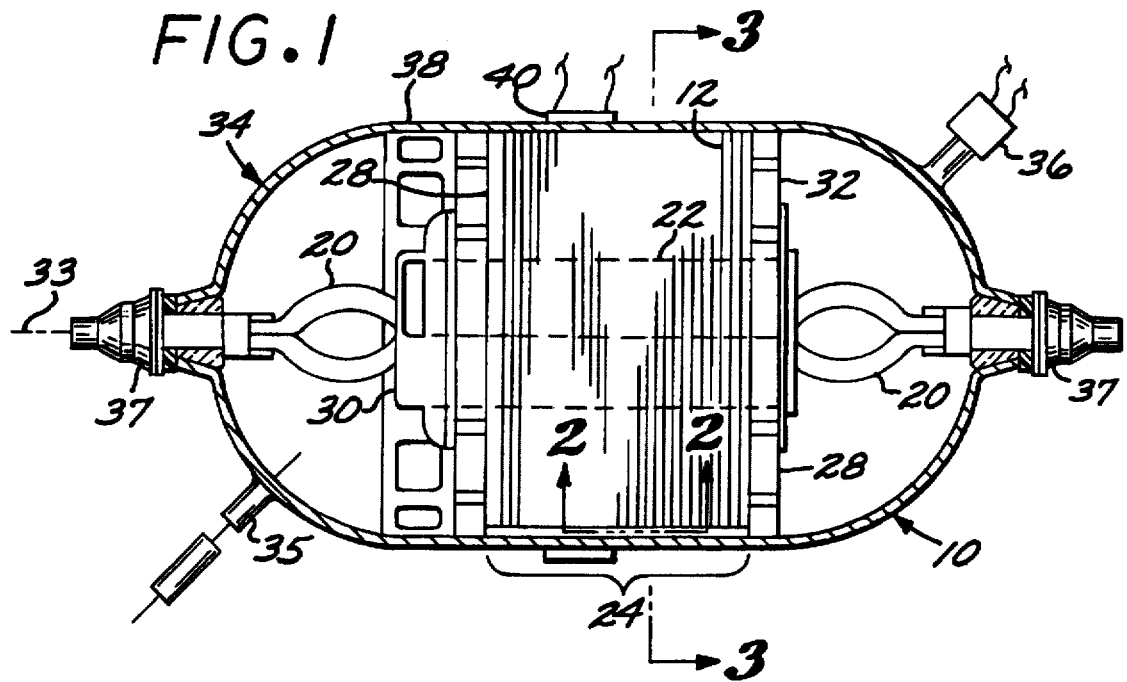
FIG. 1 is a sectional elevational view of a flight-type nickel-hydrogen energy storage cell.
Figure 2:
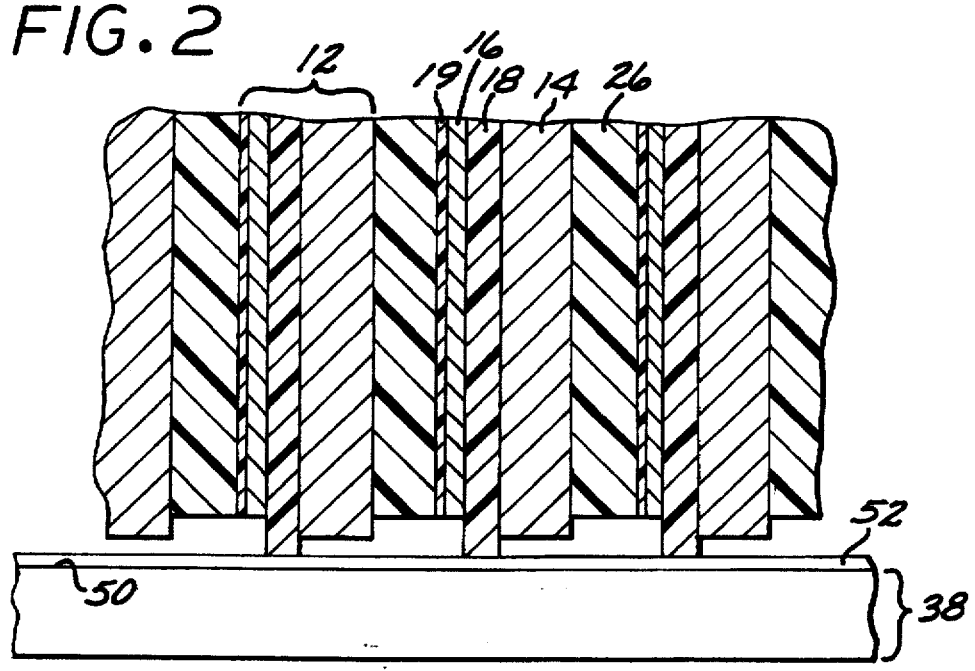
FIG. 2 is an enlargement of a detail of FIG. 1, taken generally on line 2—2 and illustrating the plate sets.

The present invention is preferably used in conjunction with a nickel-hydrogen energy storage cell 10, as illustrated in FIGS. 1—2, of the pressurized gas-metal cell type. Such an energy storage cell 10 typically comprises a plurality of individual plate sets 12. Each plate set in turn comprises an anode or positive electrode 14, a cathode or negative electrode 16, and an electrolyte-containing separator 18, which physically separates the electrodes 14 and 16 and also supplies the electrolyte medium through which ionic and electronic charge transfer. Charging and discharging of the electrodes 14 and 16 are accomplished through respective electrical leads 20.

Various constructions of nickel-hydrogen cells and components are disclosed in the following U.S. Patents, whose disclosures are herein incorporated by reference: U.S. Pat. Nos. 4,683,178; 4,584,249; 4,369,212; 4,283,844; 4,262,061; 4,250,235; 4,000,350; and 3,669,744.

The positive electrode 14 is formed by impregnating nickel hydroxide into porous sintered nickel that is supported on an etched or woven nickel electrode substrate. The negative electrode 16 is coated on one side by a sintered mixture of platinum black and polytetrafluoroethylene and on the other side with a porous layer of polytetrafluoroethylene 19. These layers are applied to a nickel substrate in the form of etched sheet or a woven mesh, to form the negative electrode 16. Many different types of separators 18 have been and may be used, including, for example, asbestos, nylon, and a cloth of zirconium oxide-yttrium oxide containing polysulfone. The electrolyte, preferably a 26 percent concentration solution of aqueous potassium hydroxide, is impregnated into the separator 18.

The individual plate sets 12 are assembled onto a central core 22 to form a stacked array 24. A monofilament polypropylene screen 26 is placed between each plate set 12 during assembly, so that oxygen liberated during overcharging at each positive electrode 14 can diffuse away from the electrode 14. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is sealed within a hermetically sealed pressure vessel 34 having a wall 38 manufactured of a material such as Inconel 718 nickel-base alloy which can withstand internal pressures on the order of 1,000 psia, without damage by hydrogen embrittlement. The nickel-base alloy has a relatively low diffusion coefficient of hydrogen therethrough, so that hydrogen is contained within the interior of the pressure vessel 34. A gas fill tube 35 allows gas content and pressure within the pressure vessel 34 to be controlled initially, but the gas fill tube is sealed after the initial charging procedures. The pressure vessel 34 is typically constructed in the form of a cylindrically walled tube with domed ends and having a cylindrical axis 33. By way of illustration, the nickel-hydrogen energy storage cell 10 having the pressure vessel 34 of external dimensions of 3 ½ to 5 ½ inches in diameter by 13–15 inches long contains about 40–100 individual plate sets 12, with a resulting electrical storage capacity of the cell of about 50 to about 400 ampere-hours. The energy storage cell 10 may be charged and discharged through thousands of cycles without apparent damage, if the charging and discharging are accomplished properly according to known procedures. A number of energy storage cells 10 are ordinarily combined in series or parallel arrangements as a battery.

The electrical leads 20 pass from the interior of the pressure vessel 34 to its exterior through electrical feedthroughs 37. The pressure within the pressure vessel 34 may optionally be monitored by any operable technique. One such pressure-monitoring device is a pressure gauge 36 communicating with the interior of the pressure vessel, which measures interior pressure directly. Another pressure-monitoring device is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage is lighter than the pressure gauge.

Figure 3:
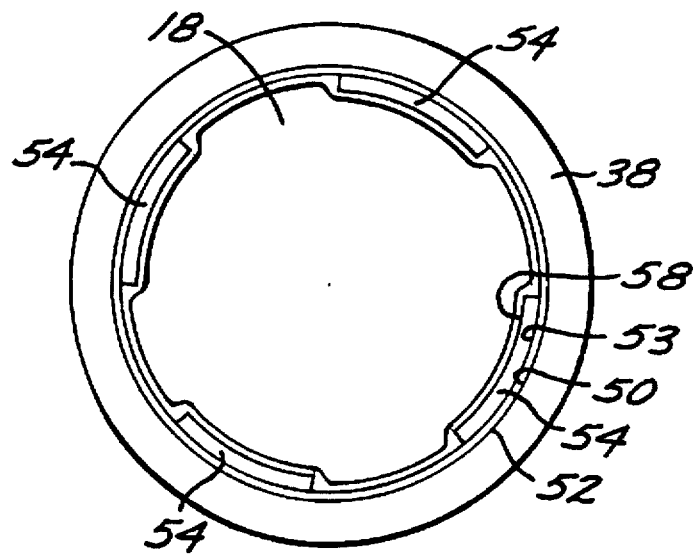
FIG. 3 is cross sectional view of the energy storage cell of FIG. 1, taken generally on line 3—3.

As seen in FIGS. 2–3, a porous ceramic layer 52 is deposited on an interiorly facing surface 50 of the wall 38 of the pressure vessel 34. The porous ceramic is preferably yttria-stabilized zirconia having a yttria content of about 20 percent by weight, and a porosity of about 12 percent by volume. The porous ceramic is preferably applied by plasma spray in a thickness of from about 0.001 to about 0.002 inches, uniformly around the circumference of the cylindrical wall 38. The porous ceramic serves as a wick to draw electrolyte into the separator 18. The separators 18 are intentionally made slightly oversize in diameter relative to the electrodes 14 and 16 and the screen 26, so that the separator 18 touches the porous ceramic layer 52 and receives electrolyte therefrom.

Figure 4:
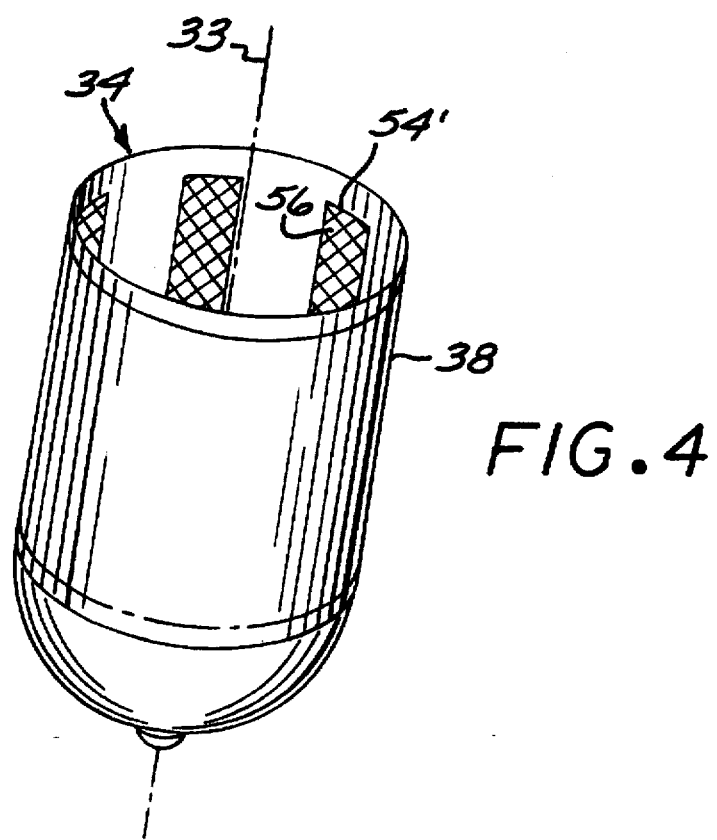
FIG. 4 is a perspective view of the pressure vessel, showing the arrangement of stripes around the interior of the wall of the pressure vessel.

An electrically insulating coating layer overlies a portion of the ceramic layer 52, contacting an interiorly facing surface 53 of the ceramic layer 52. (In a less-preferred embodiment the ceramic layer 52 is omitted, and the electrically insulating layer is deposited directly on the interiorly facing surface 50 of the wall 38.) The electrically insulating coating layer is in the form of a plurality of stripes 54 of the insulating material spaced around the circumference of the interior of the wall 38, as seen in FIGS. 3 and 4. In the illustration of FIG. 3, there are four equally spaced stripes 54 of the insulating material, each stripe subtending an angle of about 45 degrees. In the illustration of another embodiment in FIG. 4, there are six equally spaced stripes 54', each stripe subtending an angle of about 30 degrees. It is important that there be a circumferential spacing between the stripes, as shown in both FIG. 3 and FIG. 4, so that the separator 18 can contact the porous ceramic layer 52 in the region between the stripes 54. (The section of FIG. 2 is in the region between two stripes 54 and illustrates the contacting of the separator 18 to the porous ceramic layer 52.) The stripe of insulating material is elongated parallel to the cylindrical axis 33. The insulating material is preferably a polymer such as polytetrafluoroethylene (PTFE or Teflon®). The insulating material is prepared as an aqueous slurry of Teflon®-30 and painted or silk screened onto the ceramic layer 52 to form the stripes 54. The polytetrafluoroethylene is absorbed to some extent into the porosity of the ceramic coating 52. Upon drying, the polytetrafluoroethylene seals the surface of the porous ceramic coating 52 in those areas underlying the stripes 54, and also has a small thickness that defines the layered stripes 54. It is preferred to apply the insulating layer 54 as two coats of the Teflon®-30 slurry, with the first coat air dried before the second coat is applied. When no insulation layer 54 was present, the electrical resistance through one ceramic layer 52 was measured as 46.6 ohms. When the insulating layer 54 was present, the resistance to the pressure vessel wall through the insulation layer and the ceramic layer was greater than 200 ohms.

A plurality of catalytic stripes 56 of a catalytic material overlie the plurality of insulating stripes 54 on an interiorly facing surface 58 of the electrically insulating stripes 54. The catalytic stripes 56 are generally congruent with the insulating stripes 54, so that the insulating stripes 54 separate and insulate the catalytic stripes 56 from the ceramic layer 52. If the stripes 54 and 56 are not of the same size and shape, it is preferred that the insulating stripe 54 be slightly larger in lateral extent and length than the catalytic stripe 56.

The catalytic material of the stripes 56 catalyzes the chemical combination of hydrogen and oxygen to form water. The catalytic material is preferably a mixture of platinum powder, polytetrafluoroethylene, and methocel (methyl cellulose, entry 5915 of the Merck Index). The platinum powder is preferably of a bulk density of 0.8 grams per cubic centimeter with a surface area of 25 square meters per gram. About 1 gram of platinum powder, 3.6 milliliters of 3.5 percent solution of methocel and de-ionized water, and 0.37 milliliters of Teflon®-30 dispersion are mixed to form a slurry that may be applied by brush or silk screening. These proportions are not critical and may be varied. For example, the methocel content of the mixture may be varied to change the surface resistivity of the stripes 56 as desired. The slurry is applied over the insulating stripe 54, and the water is evaporated away to leave the catalytic layer about 0.001 inches thick. The remaining solid forming the catalytic stripe 56 bonds well to the underlying insulating stripe 54 by virtue of the polytetrafluoroethylene found in each of the stripes. Equivalently, other catalysts such as a mixture of platinum and palladium may be used.

After the catalytic slurry is applied and air dried, it is slowly heated to a temperature of about 340° C. to permit moisture to evaporate, and held at 340° C. for 10 minutes to sinter the coating layer.

When the cell elements are assembled, the positive electrode 14 slightly protrudes from the stacked array 24 and may, in some cases, contact the catalytic layer 56. The polytetrafluoroethylene and methocel serve as insulators against electrical conduction into or through the catalytic layer 56 between the positive electrodes 14 and the negative electrodes 16, thereby preventing internal electrical shorting between the plate sets and self discharge of the cell. The surface resistance of the catalytic layer 56 was 49 ohms per linear inch when the methocel content of the slurry was 1.2 milliliters per gram of platinum, but increased to 190 ohms per linear inch when the methocel content was increased to 3.6 milliliters per gram of platinum.

Additionally, the underlying insulating layer 54 prevents electrical conduction from the positive electrode 14 into the ceramic layer 52 and thence to the wall 38, thereby preventing external electrical shorting to the exterior of the pressure vessel. This structure provides a redundant protection against external electrical shorting, because the pressure vessel itself is normally supported in an electrically isolated manner.

FIG. 5 illustrates the method for preparing the energy storage cell of the invention. The pressure vessel 34 is supplied in a disassembled form, numeral 70. The ceramic coating layer 52 is applied, numeral 72, preferably by plasma spraying, over the inside of the cylindrical surface of the wall 38 of the disassembled parts of the pressure vessel 34. The insulating layer 54 is applied in stripes as a slurry and dried, numeral 74. The catalyst material is applied as stripes 56 overlying the insulating layer 54 and dried, numeral 76. The pressure vessel and applied layers are heated to sinter the catalytic layer 56 and bond it to the underlying insulating layer 54. The plate stack, electrolyte, and electrical leads are assembled into the pressure vessel 34, numeral 78, and the pressure vessel is closed and sealed, typically by welding, numeral 80.

The resulting energy storage cell is resistant to damage by exothermal chemical reaction of oxygen and hydrogen at the negative electrode. Instead, these reactants diffuse to the catalytic layer 56 and recombine there. The heat of reaction either heats the water reaction product or is conducted away to the wall 38 of the pressure vessel and dissipated. The energy storage cell is also resistant to internal and external shorting. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An energy storage cell, comprising:

a hermetic pressure vessel having an interior and a wall with an interiorly facing surface;

a porous ceramic coating on the interiorly facing surface of the wall, the ceramic coating having an interiorly facing surface;

an electrically insulating coating on a portion of the interiorly facing surface of the ceramic coating, the electrically insulating coating having an interiorly facing surface;

a layer of a catalytic material overlying the interiorly facing surface of the electrically insulating coating, the catalytic material catalyzing the chemical combination of hydrogen and oxygen;

at least one plate set within the interior of the pressure vessel, each plate set comprising a positive electrode, a negative electrode, and a separator between the positive electrode and the negative electrode, the separator contacting the porous ceramic coating;

an electrolyte within the pressure vessel; and a pair of electrical leads extending from the positive electrode and the negative electrode, respectively, of the at least one plate set and through an electrical feedthrough in the wall of the pressure vessel to an exterior of the pressure vessel.

2. The energy storage cell of claim 1, wherein the catalytic material comprises platinum.

3. The energy storage cell of claim 1, wherein the catalytic material comprises a mixture of a catalytic metal, polytetrafluoroethylene, and methocel.

4. The energy storage cell of claim 1, wherein the porous comprises yttria-stabilized zirconia.

5. The energy storage cell of claim 1, wherein the electrically insulating coating comprises a polymeric material.

6. The energy storage cell of claim 1, wherein the electrically insulating coating comprises a layer of polytetrafluoroethylene.

7. The energy storage cell of claim 1, wherein the pressure vessel has generally cylindrical symmetry with a cylindrical axis, and wherein the electrically insulating coating is present as at least two stripes of a coating material extending parallel to the cylindrical axis.

8. The energy storage cell of claim 1, wherein the porous ceramic coating is from about 0.001 to about 0.002 inches thick, and the layer of the catalytic material is about 0.001 inch thick.

9. An energy storage cell, comprising:

a hermetic pressure vessel having an interior and a generally cylindrical wall with an interiorly facing surface;

a porous ceramic coating on the interiorly facing surface of the wall, the ceramic coating having an interiorly facing surface;

a plurality of insulating stripes of an electrically insulating polymeric coating on the interiorly facing surface of the ceramic coating, the stripes being disposed around the circumference of the cylindrical wall and extending parallel to a cylindrical axis of the generally cylindrical wall, the electrically insulating coating having an interiorly facing surface;

a plurality of catalytic stripes of a catalytic material overlying the plurality of insulating stripes on the interiorly facing surface of the electrically insulating coating, the catalytic material catalyzing the chemical combination of hydrogen and oxygen;

a plate stack comprising a plurality of plate sets within the wall of the pressure vessel with the plate sets lying perpendicular to the cylindrical axis, each plate set comprising a positive electrode, a negative electrode, and a separator between the positive electrode and the negative electrode, the separator contacting the porous ceramic coating between the stripes of the electrically insulating coating;

a screen between each plate set;

an electrolyte within the pressure vessel; and a pair of electrical leads extending from the plate stack and through an electrical feedthrough in the wall of the pressure vessel to an exterior of the pressure vessel.

10. The energy storage cell of claim 9, wherein the catalytic material comprises platinum.

11. The energy storage cell of claim 9, wherein the catalytic material comprises a mixture of a catalytic metal, polytetrafluoroethylene, and methocel.

12. The energy storage cell of claim 9, wherein the porous ceramic coating comprises yttria-stabilized zirconia.

13. The energy storage cell of claim 9, wherein the electrically insulating coating comprises a layer of polytetrafluoroethylene.

* * * * *